(12) United States Patent
O'Kell

(10) Patent No.: US 9,702,523 B2
(45) Date of Patent: Jul. 11, 2017

(54) EMERGENCY LIGHTING

(71) Applicant: Saf-T-Glo Limited, Norfolk (GR)

(72) Inventor: Sean Patrick O'Kell, Norfolk (GB)

(73) Assignee: SAF-T-GLO LIMITED (GB)

( * ) Notice: Subject to any disclaimer, the term of this patent is extended or adjusted under 35 U.S.C. 154(b) by 0 days.

(21) Appl. No.: 14/229,334

(22) Filed: Mar. 28, 2014

(65) Prior Publication Data

US 2014/0293617 A1 Oct. 2, 2014

(30) Foreign Application Priority Data

Mar. 28, 2013 (GB) .................... 1305803.7

(51) Int. Cl.
| | | |
|---|---|---|
| *F21V 9/16* | (2006.01) | |
| *F21V 9/00* | (2015.01) | |
| *A62B 3/00* | (2006.01) | |
| *F21K 2/00* | (2006.01) | |
| *G08B 7/06* | (2006.01) | |
| *B60Q 3/46* | (2017.01) | |
| *G09F 13/04* | (2006.01) | |
| *B64D 25/00* | (2006.01) | |
| *B64D 11/00* | (2006.01) | |

(52) U.S. Cl.
CPC .................. *F21V 9/00* (2013.01); *A62B 3/00* (2013.01); *B60Q 3/46* (2017.02); *F21K 2/00* (2013.01); *G08B 7/066* (2013.01); *B64D 25/00* (2013.01); *B64D 2011/0038* (2013.01); *G09F 2013/0459* (2013.01)

(58) Field of Classification Search
CPC ................. F21V 9/16; F21V 9/00; F21K 2/00
USPC .................................................... 362/317, 84
See application file for complete search history.

(56) References Cited

U.S. PATENT DOCUMENTS

| | | | | |
|---|---|---|---|---|
| 3,317,722 | A * | 5/1967 | Whitney ........................ | 313/512 |
| 5,775,016 | A * | 7/1998 | Chien ............................. | 40/544 |
| 6,307,207 | B1* | 10/2001 | Burbank ..................... | 250/462.1 |
| 6,672,748 | B2* | 1/2004 | Baldwin ....................... | 362/558 |
| 7,036,972 | B2* | 5/2006 | Kubomura et al. .......... | 362/619 |
| 8,475,024 | B2 | 7/2013 | Stokes | |
| 2002/0015309 | A1 | 2/2002 | Stokes et al. | |
| 2007/0097664 | A1* | 5/2007 | Stokes et al. ................... | 362/84 |
| 2008/0253139 | A1* | 10/2008 | Stokes .......................... | 362/471 |
| 2009/0237912 | A1* | 9/2009 | Tsai et al. ...................... | 362/84 |
| 2009/0262514 | A1* | 10/2009 | Sturley ........................... | 362/34 |

(Continued)

FOREIGN PATENT DOCUMENTS

| | | |
|---|---|---|
| EP | 1783000 | 5/2007 |
| GB | 2314536 | 1/1998 |

(Continued)

*Primary Examiner* — Bryon T Gyllstrom
(74) *Attorney, Agent, or Firm* — Foley & Lardner LLP

(57) ABSTRACT

A photoluminescent guide for an emergency lighting system includes a housing having a first end, a second end opposite the first end, and a longitudinal slot extending between the first end and the second end. A one-piece composite insert is disposed within the longitudinal slot. The one-piece composite insert includes a photoluminescent layer and a light-transmitting layer integrally secured to the photoluminescent layer. The one-piece composite insert is configured to receive light at the photoluminescent layer through the light-transmitting layer and to emit light from the photoluminescent layer through the light-transmitting layer.

8 Claims, 2 Drawing Sheets

(56) References Cited

U.S. PATENT DOCUMENTS

| | | |
|---|---|---|
| 2010/0149825 A1 | 6/2010 | Sutter |
| 2010/0285284 A1 | 11/2010 | LaCourse |
| 2011/0049756 A1 | 3/2011 | Sutter |
| 2011/0182055 A1* | 7/2011 | Kanade et al. ................ 362/84 |
| 2013/0141921 A1* | 6/2013 | Simme ......................... 362/351 |

FOREIGN PATENT DOCUMENTS

| | | |
|---|---|---|
| GB | 2448424 | 10/2008 |
| WO | WO96/33093 | 10/1996 |
| WO | WO01/52224 | 7/2001 |

* cited by examiner

EMERGENCY LIGHTING

CROSS-REFERENCE TO RELATED PATENT APPLICATIONS

This application claims the benefit of and priority to United Kingdom Patent Application No. 1305803.7, filed Mar. 28, 2013, the entirety of which is incorporated by reference herein.

BACKGROUND

The present invention relates generally to the field of emergency lighting. More specifically, the present invention relates to emergency lighting used to indicate a path leading to an exit for the evacuation of a passenger vehicle or building (e.g., following an accident or outbreak of a fire).

The invention has particular application to passenger vehicles and/or buildings that include rows of seats provided on either side of an aisle with an exit at one or both ends of the aisle. Exits may also be provided on one or both sides of the aisle between the ends. Passenger vehicles of this type may include aircraft, trains, buses, coaches, ships, and other passenger vehicles having seats located adjacent to an aisle leading to an exit.

One example of a previous emergency lighting system is described in United Kingdom Patent No. 2,314,536. In the described system, a pathway to an exit is illuminated by photoluminescent material extending along the aisle for passengers to follow to the exit. When exposed to a light source, the photoluminescent material is activated and provides a low level light source that is normally invisible in daylight but is visible under conditions of darkness or low illumination from other light sources. For example, the photoluminescent material may be visible in the event that smoke from a fire blocks the overhead lights that normally illuminate the passenger cabin.

The level of illumination provided by the photoluminescent material under these conditions is sufficient to guide passengers to an exit to evacuate the aircraft and avoids the problems associated with electrically powered systems. For example, electrically powered systems may be prone to failure at the time they are required due to damage to the wiring supplying power to the system.

The pathway to the exit may include photoluminescent guides of predetermined length (e.g., one meter, two meters, etc.). The photoluminescent guides may be laid end to end along the aisle to provide a substantially continuous path of light when illuminated. Employing guides of pre-determined length facilitates manufacture, storage, transportation, handling and installation of the guides.

In some implementations, the pathway has a length that is not a multiple of the predetermined guide lengths. When the pathway has a length that is not an integer multiple of the predetermined guide lengths, it may be necessary to shorten one or more of the guides during installation. Shortening the guide may include cutting the guide. If the guide is sealed to prevent ingress of liquids and dirt, shortening the guide may also include re-sealing the cut end of the guide.

The photoluminescent material may be provided by an insert received within a housing of light transmitting material. One example of a photoluminescent material is strontium aluminate, which may include a dopant to enhance the photoluminescent properties. Strontium aluminate has a pale yellow color. A colored film of sheet plastics can be placed above the insert in the housing to adapt the color of the guide to match the surroundings.

In some implementations, the film of sheet plastics is separate from the insert. Providing the film of sheet plastics and the insert as separate components can lead to problems when a guide is cut to length. For example, the film of sheet plastics may be wrapped around the ends of the fixed length insert during manufacture to prevent the film from wrinkling and adversely affecting the visual appearance of the guide. When a section of guide is cut to length, the film of sheet plastics can no longer be wrapped around the cut end of the insert. As a result, the film may become wrinkled and/or not cover the entire length of the insert.

The present invention seeks to address the aforementioned problems and to provide further improvements to photoluminescent emergency lighting systems. In particular, the present invention seeks to provide improved photoluminescent emergency lighting systems for passenger vehicles such as aircraft.

One desired aim of the present invention is to provide a photoluminescent guide for an emergency lighting system, as well as an emergency lighting system employing the guide, that overcomes or mitigates one or more of the aforementioned problems and disadvantages.

Another desired aim of the present invention is to provide a photoluminescent insert for an emergency lighting system as well as a photoluminescent lighting system employing the insert.

Yet another desired aim of the present invention is to provide a method for installing an emergency lighting system employing the photoluminescent guide and/or photoluminescent insert.

SUMMARY

One aspect of the present invention is a photoluminescent guide for an emergency lighting system. The guide includes a housing and a photoluminescent insert received within the housing. The housing has a length and a width. The insert is sealed within the housing to extend from one end to the other end and from one side to the other side. The insert is a composite member including a photoluminescent element and a cap element. The cap element includes a light transmitting film. The photoluminescent element is disposed below the cap element for receiving and emitting light through the cap element and through a light transmitting portion of the housing.

The photoluminescent element may include a polymeric material in which photoluminescent material is suspended. The cap element may include a film of sheet plastics. The light transmitting film of the cap element may be colored to match or contrast with the color of an adjacent surface on which the guide is positioned in use.

The insert may include a base element with the photoluminescent element disposed between the base element and the cap element. The insert may be flexible. For example the insert may include a flexible tape or ribbon. Alternatively, the insert may be rigid. For example the insert may include a rigid strip.

The housing may be an extrusion or molding with a longitudinal slot in which the insert is received. The slot may be open at one or both ends. The insert may be sealed within the housing by closing the open end or ends of the slot. An open end of the slot may be closed by a cap or film positioned across the open end and sealed. Alternatively, the open end may be closed by applying adhesive or mastic to the open end.

The guide may be attached directly to the surface or indirectly. For example, the guide may be located (e.g., releasably) in a holder attached to the surface. The guide may be straight or curved or bent or have any other shape.

A plurality of guides may be arranged to define a pathway in an emergency lighting system capable indicating a route to an exit in an emergency for evacuating an area. The pathway may include at least one linear section and/or at least one non-linear section. The linear section may include one or more guides that are straight. The non-linear section may include one or more guides that are curved or bent or any other shape. Curved guides may have a constant radius of curvature or a variable radius of curvature.

In some implementations, the guide may be employed in an emergency lighting system for a passenger vehicle. For example, the guide may be employed in an emergency lighting system for an aircraft. The emergency lighting system can be adapted to any configuration of pathway. Guides of any size or shape (e.g., straight, curved, bent, or any other shape) may be employed separately or in any combination to adapt the emergency lighting system to the layout of the vehicle.

Another aspect of the present invention is a photoluminescent insert for an emergency lighting system. The insert includes a composite member including a photoluminescent element and a cap element. The cap element includes a light transmitting film. The photoluminescent element is disposed below the cap element for receiving and emitting light through the cap element.

The insert may form part of a guide in which the insert is received within a housing. The housing may have a length and a width. The guide may be in accordance with the preceding aspect of the invention. The insert may be sealed within the housing to extend from one end to the other end and from one side to the other side.

The photoluminescent element may include a polymeric material in which photoluminescent material is suspended. The cap element may include a film of sheet plastics. The film may be colored to match or contrast with the color of a surrounding area.

The insert may include a base element with the photoluminescent element disposed between the base element and the cap element. The insert may be relatively flexible. For example, the insert may be cut to length from a flexible tape or ribbon material. Alternatively, the insert may be substantially rigid. For example, the insert may be cut to length from a rigid strip material.

Another aspect of the invention is an emergency lighting system including the guide or insert of the preceding aspects of the invention. The emergency lighting system may be employed in a vehicle for guiding passengers to an exit in darkness or low ambient light. The system may be configured to provide a pathway for guiding passengers to the exit.

The pathway may include a plurality of guides. The guides may be laid end to end. The guides may be of pre-determined length shorter than the length of the pathway. The pathway may include at least one linear section and/or at least one non-linear section. The linear section may include one or more guides that are straight. The non-linear section may include one or more guides that are curved or bent or any other shape. Curved guides may have a constant radius of curvature or a variable radius of curvature.

The emergency lighting system can be adapted to any configuration of pathway. Guides that are straight, curved, bent or any other shape may be employed separately or in any combination to adapt the emergency lighting system to the layout of the vehicle.

Another aspect of the invention is method for installing an emergency lighting system. The method includes providing a plurality of photoluminescent guide. Each guide includes a housing and a photoluminescent insert received within the housing. The housing has a length and a width. The insert is sealed within the housing to extend from one end to the other end and from one side to the other side. The method further includes laying the guides end to end to form a pathway. The insert is a composite member including a photoluminescent element and a cap element. The cap element includes a light transmitting film. The photoluminescent element is disposed below the cap element for receiving and emitting light through the cap element and through a light transmitting portion of the housing.

The pathway may include at least one linear section and/or at least one non-linear section. The linear section may include one or more guides that are straight. The non-linear section may include one or more guides that are curved or bent or any other shape. Curved guides may have a constant radius of curvature or a variable radius of curvature. Guides that are straight, curved, bent or any other shape of guide may be employed separately or in any combination to adapt the emergency lighting system to any configuration of pathway. For implementations of the emergency lighting system in a vehicle (e.g., an aircraft), the emergency lighting system can be adapted to the layout of the vehicle.

The method may include cutting one or more guides to length and resealing the insert within the housing. The guide and insert may be in accordance with preceding aspects of the invention.

These and other features benefits and advantages of the invention, according to the various aspects, will be apparent from the following description of exemplary embodiments with reference to the accompanying drawing.

DETAILED DESCRIPTION

Figure 1:
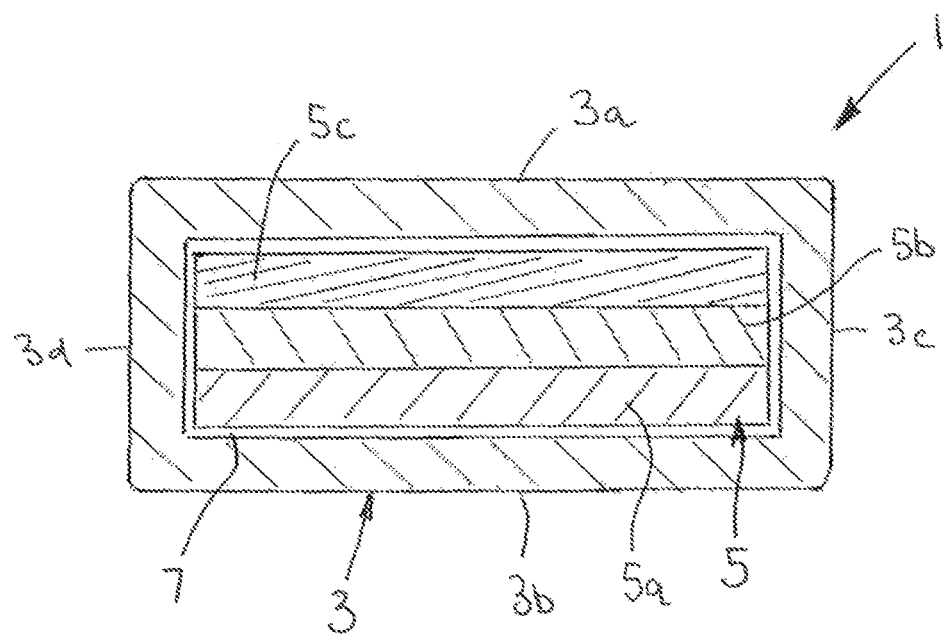
FIG. 1 is a cross-section of a photoluminescent guide for an emergency lighting system, according to an exemplary embodiment.
Figure 2:
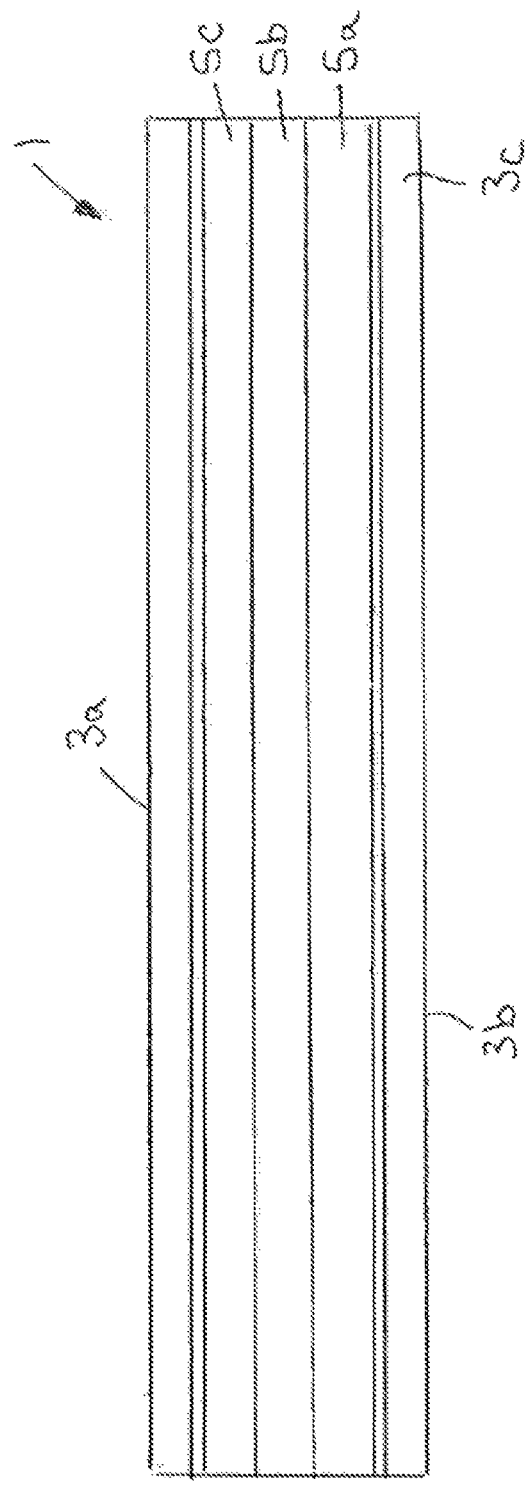
FIG. 2 is a side view of the photoluminescent guide of FIG. 1, according to an exemplary embodiment.

Referring to FIGS. 1-2, a photoluminescent guide 1 for an emergency lighting system is shown, according to an exemplary embodiment. The emergency lighting system may be implemented, for example, in a passenger vehicle such as an aircraft, train, bus, coach, or other passenger vehicle. The emergency lighting system is configured to guide passengers from a seating area of the vehicle to an exit in the event of an emergency and/or under conditions of darkness or low levels of ambient light.

It should be noted that although the present invention is described in the context of an emergency lighting system for a vehicle, the systems and methods described herein may be used in a variety of implementations in addition to passenger vehicles. For example, the emergency lighting system may be used in conjunction with a building (e.g., a theater, an office, a school, a hospital, etc.) or other venue in which emergency lighting may be useful. The following disclosure illustrates an exemplary embodiment of the invention in which the emergency lighting system is used in conjunction with a passenger vehicle.

The system may be configured to define a pathway leading to an exit along which passengers can move to access the exit when evacuating the vehicle. The pathway may lead to more than one exit depending on the size and layout of the vehicle. For example, in an aircraft, the pathway may be defined between rows of seats on either side of an aisle within a cabin to guide passengers along the aisle to exits at the front, rear and/or center of the aircraft. In aircraft having more than one level or deck connected by a stairway, the pathway may be defined between the sides of the stairway. Additional photoluminescent markers may be provided at the ends and/or along the nose of individual steps to assist passengers in negotiating the stairway in an emergency requiring passengers to move from one level or deck to another to evacuate the aircraft. This vehicle configuration is provided by way of example only and the invention is not limited to systems configured in this manner.

In some embodiments, the emergency lighting system includes a plurality of photoluminescent guides 1. The guides 1 may be laid end to end along the pathway. The guides 1 may be arranged along one or both sides of the pathway. The pathway may include at least one linear section. The pathway may include at least one non-linear section. The linear section may include one or more guides that are straight. The non-linear section may include one or more guides that are curved or any other shape. Curved guides may have a constant radius of curvature or a variable radius of curvature.

Still referring to FIGS. 1-2, each guide 1 is shown to include an outer housing 3 and a photoluminescent insert 5 received within the housing 3. In some embodiments, the housing 3 is an extrusion or molding of a light transmitting material (e.g., plastics such as polycarbonate). The housing 3 may be capable of withstanding forces and loads from people standing on the guide 1 and/or from cases or equipment (e.g., luggage) passing over the guide 1 when installed along the floor of a vehicle.

The housing 3 may be substantially rectangular in cross-section. The housing 3 is shown to include opposing main walls 3a, 3b and opposing side walls 3c, 3d defining a central slot 7 extending longitudinally from one end of the housing 3 to the other end.

In another embodiment (not shown), the housing 3 may include an upper part and a lower part joined along the opposing side walls 3c, 3d. The upper and lower parts may be joined together releasably (e.g., by interengageable formations) or permanently (e.g., by adhesive or welding). Both the upper part and lower part may be made of light transmitting material as aforementioned. Alternatively, the upper part may be made of light transmitting material and the lower part may be made of a material that is opaque or otherwise does not transmit light.

Still referring to FIGS. 1-2, the insert 5 is shown received in the slot 7. The insert 5 may extend from one end of the slot 7 to the other end and from one side of the slot 7 to the other side. The ends of the slot 7 may be closed by applying adhesive or mastic (not shown) to the ends of the housing to seal the insert 5 within the slot 7. In this way, ingress of liquids or dirt to the slot 7 which could have an adverse effect on the appearance and operation of the insert 5 may be prevented.

The insert 5 is shown to include three elements: a base element 5a, a photoluminescent element 5b, and a cap element 5c. The elements 5a-5c are shown having equal thickness that are exaggerated for the purposes of clarity. In various embodiments, the elements 5a-5c may have different thickness and may be considerably thinner than shown in FIGS. 1-2.

In various embodiments, the base element 5a may include a polymeric material (e.g., polycarbonate, polyester, etc.) and/or a metal or alloy (e.g., aluminium). The photoluminescent element 5b may include one or more layers of a polymeric material with one or more of the layers containing a photoluminescent material. For example, the polymeric material may be a vinyl layer and the photoluminescent material may be strontium aluminate. The photoluminescent later may include a dopant to enhance the photoluminescent properties. The photoluminescent element 5b may include other materials in one or more layers to provide desired properties. The cap element 5c may include a colored film of sheet plastics such as polyester.

The colored film may be chosen to match the color of the surroundings in which the guide 1 is positioned in use. For example, if the guide 1 is mounted on a carpeted floor, the film may match the color of the carpet. The color may be chosen to maximize the light reaching the photoluminescent element 5b for charging the photoluminescent material by exposure to natural or artificial light sources and/or for minimizing the reduction in light emission from the photoluminescent material for illumination in darkness or low levels of ambient light.

The materials and thickness of the elements 5a, 5b, 5c forming the insert 5 may be chosen so that the insert 5 is configured to be relatively flexible. For example, the insert 5 may be cut to length from a flexible tape or ribbon that can be wrapped or wound in a roll for storage. Alternatively, the materials and thickness of one or more of the elements 5a, 5b, 5c forming the insert may be chosen so that the insert is configured to be substantially rigid. For example, the insert 5 may be cut to length from a rigid strip.

In some embodiments, the base element 5a, photoluminescent element 5b, and cap element 5c can be secured together to form an integral, one-piece composite insert 5 for location within the slot 7.

In some embodiments, the base element 5a is an extrusion or molding. The photoluminescent element 5b may be applied to the base element 5a as a coating or extrusion in one or more layers. The base element 5a and photoluminescent element 5b may be a co-extrusion. The cap element 5c may be secured to the photoluminescent element 5b by adhesive or any other suitable means such as a light transmitting double sided tape.

Still referring to FIGS. 1-2, the insert 5 is shown extending between the sides 3c, 3d of the housing 3 and between the ends of the housing 3. In this way, light is emitted over substantially the entire area of the main wall 3a. Main wall 3a may be upward facing when the guide 1 is installed on a surface such as a floor by any suitable means.

In some embodiments, the lower main wall 3b can be attached directly to the surface (e.g., using an adhesive or fastener). In some embodiments, the guide 1 may be releasably mounted in a channel of a holder secured to the floor. For example, United Kingdom Patent No. 2,448,424B describes a holder that can be used to secure the guide 1 to the floor and is incorporated by reference herein for its description of such a holder.

The guides 1 may have a pre-determined (e.g., uniform) length. For example guides 1 may have a uniform one or two meter length. The guides 1 may be sealed at the ends such that multiple guides 1 can be placed end to end to provide a substantially continuous path of light when illuminated. In some implementations, one or more of the guides 1 may be cut to shorten the length of the guides to fit the pathway in which the guides are installed.

By attaching the elements 5a, 5b, 5c of the insert to each other to form an integral, one-piece composite insert, the guide 1 can be cut without any adverse effect on the appearance of the insert 5 when the guide 1 is resealed to fit the pathway. In particular, the problems of the prior art arrangement with the colored film wrinkling when cutting the guide are avoided.

In some embodiments (not shown), the base element 5a may be omitted from the integral one-piece composite insert 5. In other words, the integral one-piece composite insert 5 may include only the photoluminescent element 5b and the cap element 5c. In this arrangement, the material and thickness of the photoluminescent element 5b may be chosen so that the insert is configured to be flexible or rigid.

As utilized herein, the terms "relatively," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the photoluminescent guide as shown in the exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied.

The order or sequence of any process or method steps may be varied or re-sequenced according to alternative embodiments. Other substitutions, modifications, changes and omissions may also be made in the design, operating conditions and arrangement of the exemplary embodiments without departing from the scope of the present invention.

What is claimed is:

1. A photoluminescent guide configured for use in an aircraft emergency lighting system and arranged in use to indicate a path leading to an exit, the photoluminescent guide comprising:

a housing having a first end, a second end opposite the first end, a top wall, a bottom wall opposite the top wall, and opposing side walls extending between the top wall and the bottom wall;

wherein the top wall, the bottom wall, and opposing side walls extend between the first end and the second end and define a longitudinal slot extending between the first end and the second end; and wherein the longitudinal slot is enclosed within the top wall, the bottom wall, and opposing side walls; and a one-piece composite insert disposed within the longitudinal slot, the one-piece composite insert comprising a non-powered photoluminescent layer and a light-transmitting layer integrally secured to the photoluminescent layer;

wherein the light-transmitting layer comprises an elongate colored film of sheet plastics configured to alter a color of light emitted by the photoluminescent layer; and wherein the top wall is made of a light-transmitting material and the light-transmitting layer is disposed below the top wall such that in use the one-piece composite insert receives light at the photoluminescent layer through the top wall and the light-transmitting layer and emits light from the photoluminescent layer through the light-transmitting layer and the top wall.

2. The photoluminescent guide of claim 1, wherein the housing has a rectangular cross-section; and wherein the longitudinal slot is a disposed within the rectangular cross-section.

3. The photoluminescent guide of claim 1, wherein the housing comprises an upper part forming the top wall and a lower part forming the bottom wall opposite the top wall;

wherein the upper part and lower part are joined together to form the side walls extending between the top wall and the bottom wall;

wherein the longitudinal slot is disposed between the upper part and the lower part.

4. The photoluminescent guide of claim 1, wherein the housing is configured to transmit light received from an external source to the one-piece composite insert through the top wall and to transmit light emitted by the one-piece composite insert through the top wall.

5. The photoluminescent guide of claim 1, wherein the one-piece composite insert is flexible and the housing provides structural support for the one-piece composite insert.

6. The photoluminescent guide of claim 1, wherein the one-piece composite insert extends between the first end of the housing and the second end of the housing.

7. The photoluminescent guide of claim 1, wherein the housing is formed by extrusion molding; and wherein at least one of the first end or the second end is open such that the one-piece composite insert can be inserted into the housing through at least one of the first end or the second end.

8. The photoluminescent guide of claim 1, further comprising an end cap configured to seal at least one of the first end or the second end of the housing.

* * * * *